United States Patent
Fujii et al.

(10) Patent No.: US 6,995,972 B2
(45) Date of Patent: Feb. 7, 2006

(54) SOLID ELECTROLYTIC CAPACITOR AND METHOD FOR MANUFACTURING THE SAME

(75) Inventors: Eizo Fujii, Hirakata (JP); Hidenori Kamigawa, Higashiosaka (JP); Tadayoshi Kawano, Daito (JP); Yasuhiko Ito, Daito (JP); Takashi Yoshioka, Kyoto (JP); Syouji Umeda, Daito (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 0 days.

(21) Appl. No.: 11/042,154

(22) Filed: Jan. 26, 2005

(65) Prior Publication Data

US 2005/0162816 A1  Jul. 28, 2005

(30) Foreign Application Priority Data

Jan. 28, 2004  (JP) .............................. 2004-019139

(51) Int. Cl.
  *H01G 4/228* (2006.01)
  *H01G 9/10* (2006.01)

(52) U.S. Cl. ...................... 361/540; 361/538; 29/25.03

(58) Field of Classification Search ................ 361/523, 361/528–529, 532–533, 538, 540; 29/25.03
See application file for complete search history.

(56) References Cited

U.S. PATENT DOCUMENTS

| 6,262,878 | B1 * | 7/2001 | Shirashige et al. ......... 361/508 |
| 6,616,713 | B2 * | 9/2003 | Sano et al. ................ 29/25.03 |
| 6,808,541 | B2 * | 10/2004 | Maeda ...................... 29/25.03 |
| 2003/0174460 | A1 * | 9/2003 | Sano et al. ................ 361/523 |

FOREIGN PATENT DOCUMENTS

JP  2001-6978  1/2001

* cited by examiner

*Primary Examiner*—Eric W. Thomas
(74) *Attorney, Agent, or Firm*—Armstrong, Kratz, Quintos, Hanson & Brooks, LLP

(57) ABSTRACT

A solid electrolytic capacitor includes a capacitor element provided with an anode body from which an anode lead projects, an anode-side lead frame positioned below the anode lead, and a bolster member which is provided between the anode lead and the anode-side lead frame and electrically connects the anode lead and the anode-side lead frame. At least one portion of the anode lead cuts into the bolster member.

6 Claims, 5 Drawing Sheets

SOLID ELECTROLYTIC CAPACITOR AND METHOD FOR MANUFACTURING THE SAME

TECHNICAL FIELD

The present invention relates to a solid electrolytic capacitor and a method for manufacturing the same.

BACKGROUND ART

Chip-type solid electrolytic capacitors as shown in FIG. 6 are well known (see JP 2001-6978A).

A solid electrolytic capacitor (1) is provided with a capacitor element (2), to a bottom surface of which is attached a lead frame (9), (90), the capacitor element (2) being covered by a housing (70) made of a synthetic resin.

The capacitor element (2) is made by forming a dielectric oxide coating (21) on the surrounding surface of an anode body (20), which is a sintered valve metal member, with a cathode layer (3), a carbon layer (6), and a silver paste layer (60) formed in this order on the dielectric oxide coating (21). Here, the term "valve metal" refers to a metal which forms an extremely compact dielectric oxide coating having durability when treated by electrolytic oxidation. Al (aluminum), Ta (tantalum), Ti (titanium), and Nb (niobium) are such metals.

An anode lead (22), which is an elongated tantalum cylinder, protrudes from a vertically central portion of the anode bodies (20). The anode lead (22) and the anode-side lead frame (9) have different heights, and are therefore connected electrically via a cylindrical bolster member (4) positioned on the anode-side lead frame (9). A surrounding surface of the bolster member (4) abuts the anode lead (22) and the anode lead frame (9).

The diameter and length of the anode lead (22) are both 1 mm or lower, so bending and attaching the anode lead (22) directly to the anode-side lead frame (9) is difficult. Accordingly, the bolster member (4) is used for the electrical connection of the anode lead (22) and the anode-side lead frame (9).

The following is a manufacturing process for the solid electrolytic capacitor (1). First, as shown in FIG. 7, a metal plate (8) made of copper, steel alloy, or another material is punched and formed such that a terminal component portion (80), which becomes the anode-side lead frame (9), and a terminal component portion (81), which becomes a cathode-side lead frame (90), are separated from one another.

Next, as shown in FIG. 8, the bolster member (4) is placed on the anode-side terminal component portion (80), and that anode-side terminal portion (80) and the bolster member (4) are resistance-welded together. The bolster member (4) is made of tantalum and has a diameter of approximately 0.2 to 0.5 mm and a length of 1 mm or less, and a voltage of approximately 4V is applied with a current of 0.5 kA (electric energy of approximately 2 KJ) when resistance-welding the metal plate (8) made of copper and the bolster member (4).

Next, the capacitor element (2) on which the dielectric oxide coating (21), the cathode layer (3), and so on are formed, are positioned straddling the terminal component portions (80) and (81), and the anode lead (22) and the bolster member (4) are resistance-welded together. As shown in FIG. 9, the capacitor element (2) and the terminal component portions (80) and (81) are covered by a resin which forms the housing (70), forming a resin block (7). This resin block (7) and the terminal component portions (80) and (81) are cut using a dicing saw or similar device along a surface which includes line D—D and line E—E, obtaining the solid electrolytic capacitor (1) shown in FIG. 6.

The following problems exist in making the solid electrolytic capacitor (1).

1. There is variability in the contact area between the bolster member (4) and the anode leads (22) because the surrounding surface of the bolster member (4) abuts the anode leads (22) in a so-called "point contact" manner. Welding is difficult if that contact area is small, as the flow of current when performing a resistance weld deteriorates.

2. Handling of the bolster member (4) is difficult, as it rolls around and gets lost easily, because its diameter and length are both 1 mm or lower and its shape is cylindrical. Consequently, it is difficult and labor-intensive to position the bolster member (4) on the terminal component portion (80) while resistance-welding the terminal component portion (80) and the bolster member (4) together.

3. As shown in FIG. 10, in the above manufacturing method, probes (5) are applied to the terminal component portion (80) and the bolster member (4) and resistance welding is performed, after which, as shown in FIG. 11, the anode lead (22) and the bolster member (4) are resistance-welded. As a result, a welding current is applied twice to the terminal component portion (80).

Consequently, spot defects are more likely to appear on a rear surface of the terminal component portion (80) during welding. The terminal component portion (80) becomes the anode-side lead frame (9), so, as shown in FIG. 6, if the spot defects stand out, this adversely affects the appearance of the solid electrolytic capacitor (1), since the rear surface of the lead frame (9) is exposed. Furthermore, applying the welding current twice to the terminal component portion (80) makes it more likely for the terminal component portion (80) to become deformed due to heat from the current.

An object of the present invention is to resolve the above problems.

DISCLOSURE OF INVENTION

At least one part of an anode lead (22) of a solid electrolytic capacitor (1) of the present invention cuts into a bolster member (4).

Further, a method for manufacturing this solid electrolytic capacitor (1) comprises a step of lining up in the same orientation a plurality of anode bodies (20), which are provided with first wires (25), which become anode leads (22); a step of providing a second wire (40), which becomes the bolster member (4), straddling the plurality of first wires (25); a step of joining overlapping sections of the first wires (25) and the second wire (40) and letting at least a part of the first wires (25) cut into the second wire (40); a step of forming the anode lead (22) and the bolster member (4) by cutting the first wires (25) and second wire (40); and a step of placing the bolster member (4) on the terminal component portion (80), which becomes the anode-side lead frame (9), and joining the terminal component portion (80) and the bolster member (4).

Resistance welding is used to join the overlapping sections of the first wires (25) and the second wire (40), and the terminal component portion (80) and the bolster member (4).

EFFECTS OF THE PRESENT INVENTION

1. There is a large area of contact between an anode lead (22) and a bolster member (4), because the anode lead (22) cuts into the bolster member (4). Resistance welding is therefore easier as the flow of the current is better when performing resistance welding.

2. After the first wires (25) are joined to a second wire (40) while letting them cut into the second wire (40), the second wire (40) is cut, thus forming the bolster member (4). Conventionally, there existed a danger of dropping and losing the bolster member (4) during the attachment process because the finely cut bolster member (4) would be attached to the anode lead (22). However, this danger is eliminated in the present invention because the second wire (40) is elongated. As a result, labor involved in manufacturing the solid electrolytic capacitor (1) is reduced.

3. After joining the first wire (25) to the second wire (40) via resistance welding, the bolster member (4) is formed and joined by resistance welding to the terminal component portion (80), which becomes the lead frame (9). Since welding current is only applied one time to terminal component portion (80), it is more difficult for spot defects to appear on a rear surface of the terminal component portion (80) during welding, compared to the conventional case. Furthermore, since welding current is applied to the terminal component portion (80) a fewer number of times, deformation of the terminal component portion (80) due to heat from the current is rarer.

BEST MODE FOR CARRYING OUT THE INVENTION

The following is a detailed description of an embodiment of the present invention, with reference to the drawings.

Figure 1:
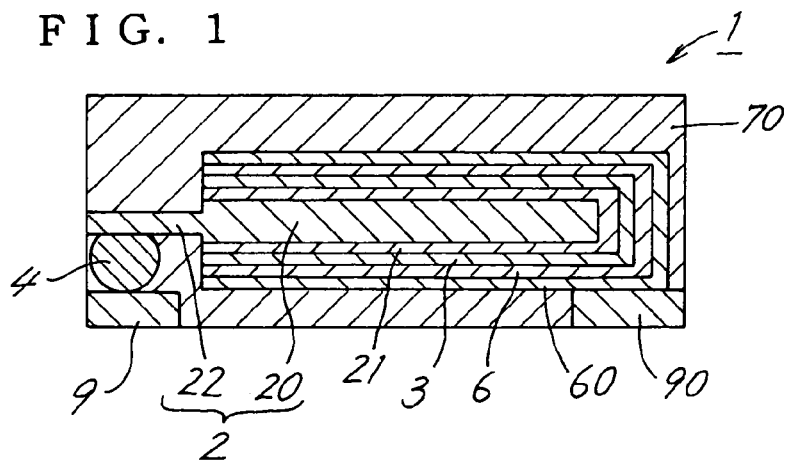
FIG. 1 is a cross-sectional view of a solid electrolytic capacitor.
Figure 6:
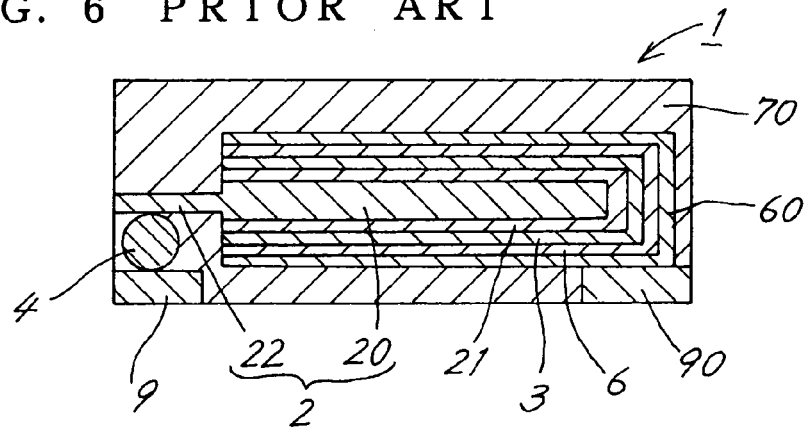
FIG. 6 is a cross-sectional view of a conventional solid electrolytic capacitor.
Figure 7:
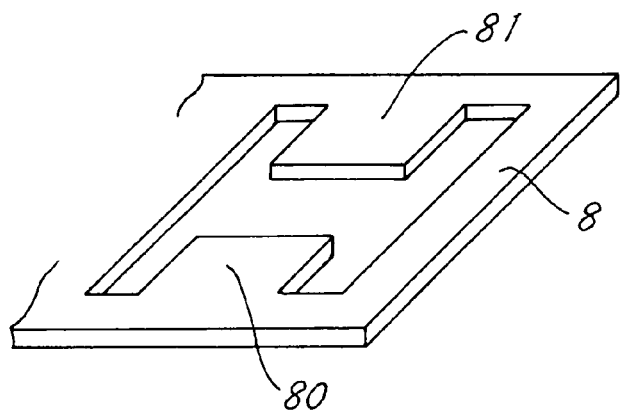
FIG. 7 is a perspective view showing a conventional method for manufacturing a solid electrolytic capacitor.
Figure 8:
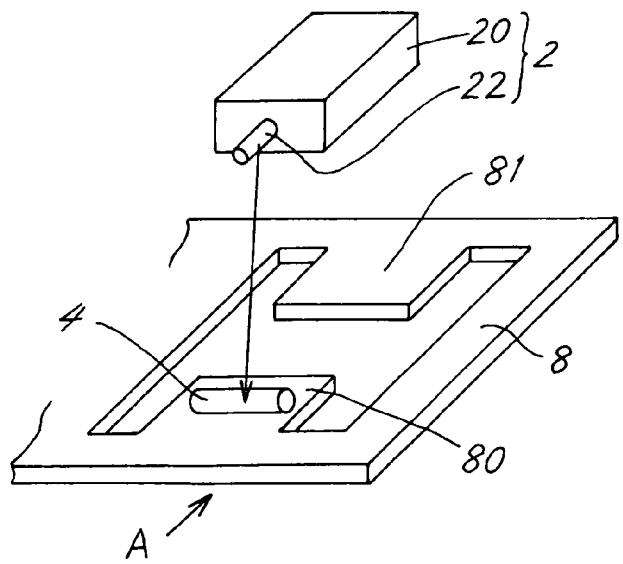
FIG. 8 is a perspective view showing a conventional method for manufacturing a solid electrolytic capacitor.

FIG. 1 is a cross-sectional view of a solid electrolytic capacitor (1). The solid electrolytic capacitor (1) is provided with a capacitor element (2) to a bottom surface of which is attached a lead frame (9), (90), the capacitor element (2) being covered by a synthetic resin housing (70), made from epoxy resin or the like. The capacitor element (2) comprises an anode lead (22) which projects from an anode body (20), and this configuration is the same as the conventional one shown in FIG. 6.

The anode lead (22) is electrically connected to the anode-side lead frame (9) via a bolster member (4), and one portion of the anode lead (22) cuts into the bolster member (4). The amount of this cut in vertical direction is at least 50% of a diameter of the anode lead (22). Specifically, the amount that the anode lead (22) cuts into the bolster member (4) is approximately 0.1 mm, although it is-not limited to this value. Additionally, a length L of the anode body (20) is approximately 1 mm, its width W is approximately 0.7 to 0.8 mm, and its height H is approximately 0.5 to 0.6 mm (see FIG. 2), although they are not limited to these values.

There is a large area of contact between the anode lead (22) and the bolster member (4), because the anode lead (22) cuts into the bolster member (4), and this results in a good current flow during resistance welding. Consequently, resistance welding is easier, and this point is one characteristic of the present embodiment.

Figure 2:
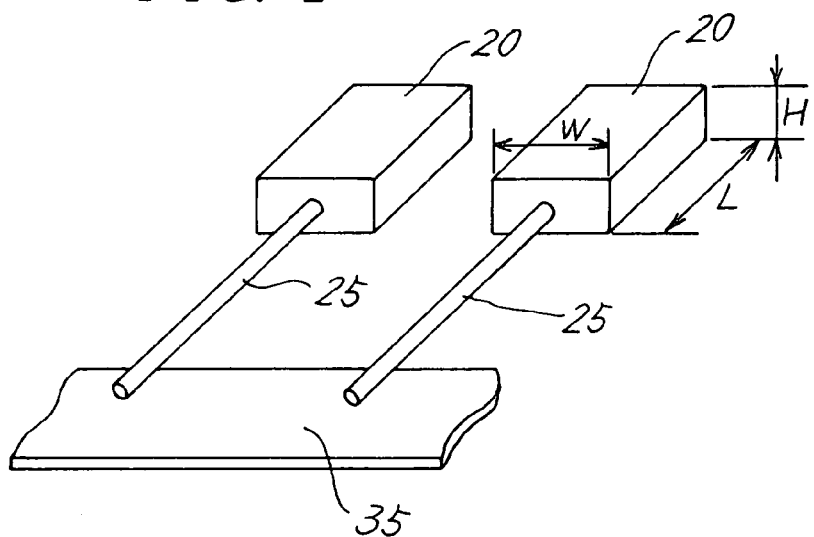
FIG. 2 is a perspective view showing a method for manufacturing a solid electrolytic capacitor.

The following is a method for manufacturing the solid electrolytic capacitor (1) in FIG. 1. First, a process for forming the capacitor element (2) is described. As shown in FIG. 2, a plurality of anode bodies (20), which are provided with first wires (25) which become the anode leads (22), are lined up in the same orientation, and the front ends of the first wires (25) are attached to a conductive carrier bar (35). In the present embodiment, the first wires (25) are made of tantalum, but other valve metals may also be used.

Figure 3:
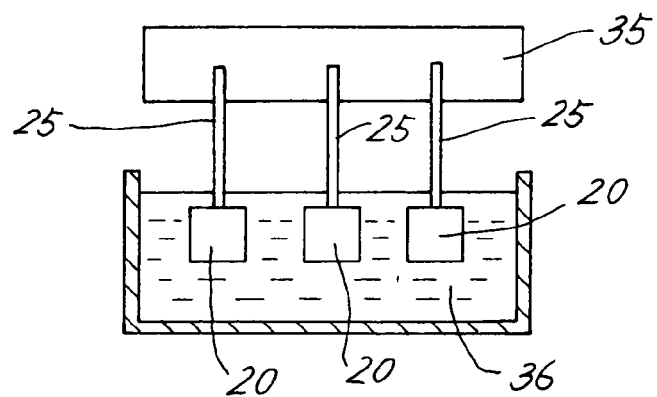
FIG. 3 is a front view showing a method for manufacturing a solid electrolytic capacitor.

As shown in FIG. 3, a surrounding surface of the plurality of anode bodies (20) is immersed in a forming solution (36), a current is applied to the anode bodies (20) from the carrier bar (35), and a dielectric oxide coating (21) is formed on the surrounding surface of the anode bodies (20).

Next, a solution is formed, wherein a monomer is mixed into an oxidizing solution with water as a solvent. A portion of the anode bodies (20) onto which the dielectric oxide coating (21) is formed is immersed in that mixed solution, and a cathode layer (3) (see FIG. 1), composed of polypyrrole or the like, is formed. A carbon layer (6) and a silver paste layer (60) are formed on the cathode layer (3), completing the capacitor element (2).

Figure 4:
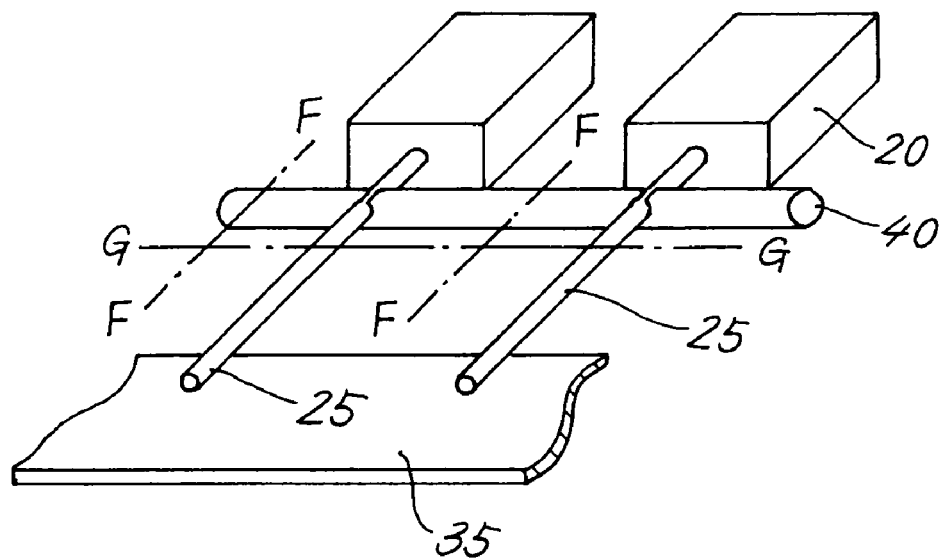
FIG. 4 is a perspective view showing a method for manufacturing a solid electrolytic capacitor.

Next, the capacitor elements (2), with the carrier bar (35) still attached, are oriented sideways, as shown in FIG. 4. A second wire (40) made of nickel, which becomes the bolster member (4), is provided straddling a lower side of a base end portion of the plurality of first wires (25).

A probe (not shown in the drawings) is applied to an overlapping section of the first wires (25) and the second wire (40) from above that overlapping section, and the first wires (25) and the second wire (40) are resistance-welded together by applying a voltage of approximately 2V (approximately 1 KJ of electrical energy). When this happens, the first wires (25) are caused to cut into the second wire (40).

Figure 5:
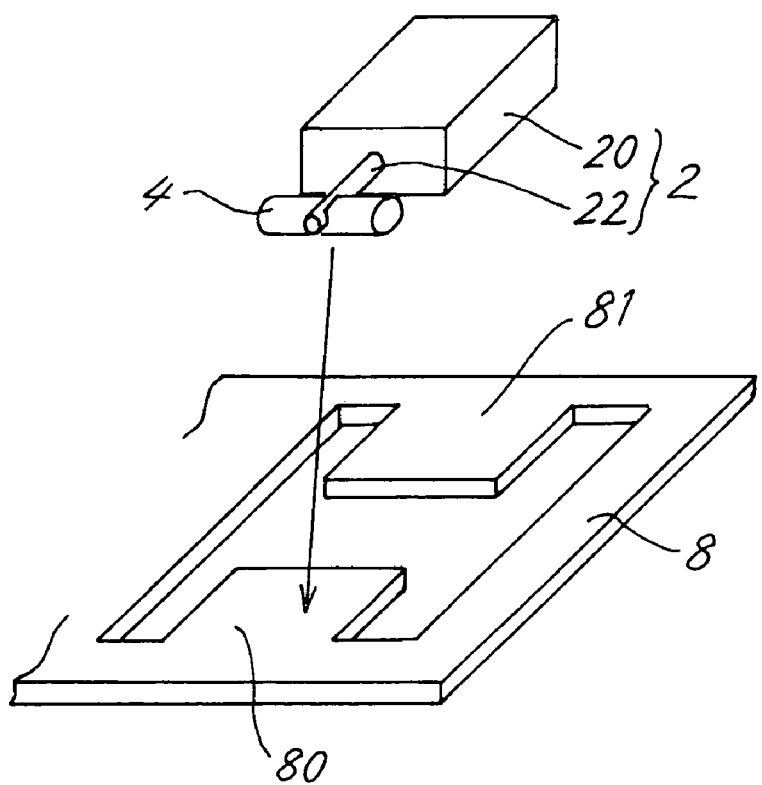
FIG. 5 is a perspective view showing a method for manufacturing a solid electrolytic capacitor.

The first wires (25) and the second wire (40) are cut along planes including line F—F and line G—G in FIG. 4, forming the capacitor element (2) and the bolster member (4) shown in FIG. 5. The carrier bar (35) is cut away from the capacitor elements (2).

Next, as shown in FIG. 5, a metal plate (8), which is formed by separating a terminal component portion (80), which becomes the anode-side lead frame (9), and a terminal component portion (81), which becomes the cathode-side lead frame (90), is prepared, and the capacitor element (2), which is provided with the bolster member (4), is positioned straddling the terminal component portions (80) and (81). The shape of the terminal component portions (80) and (81) and the fact that the metal plate (8) is made of copper, steel alloy or the like, are the same as conventionally.

The bolster member (4) is placed on one terminal component portion (80), which becomes the anode-side lead frame (9). A conductive adhesive is applied to the other terminal component portion (81). The bolster member (4) and the terminal component portion (80) are resistance-welded together by applying a voltage of approximately 3 V (approximately 1.5 KJ of electrical energy) to the bolster member (4) and the terminal component portion (80). The surrounding surface of the anode body (20) of the capacitor element (2) is attached to the terminal component portion (81) using the conductive adhesive.

The reason for making the bolster member (4) from nickel and not from tantalum, as is conventional, is because the terminal component portion (80) is made of copper, and less voltage needs to be applied when resistance-welding a nickel material to a copper material than when resistance-welding a tantalum material to a copper material. Specifically, when resistance-welding the metal plate (8) made from copper and the bolster member (4) made from tantalum, a voltage of approximately 4 V (approximately 2 KJ of electrical energy) would be applied as described above, but when resistance-welding the metal plate (8) made from copper to the bolster member (4) made from nickel, a voltage of only approximately 3 V (approximately 1.5 KJ of electrical energy) needs to be applied. Additionally, in contrast to tantalum, which melts at approximately 2850° C., nickel melts at approximately 1450° C. In contrast to the specific resistance of nickel, which is $6.9 \times 10^{-6}$ ($\Omega \cdot cm$), the specific resistance of tantalum is $12.5 \times 10^{-6}$ ($\Omega \cdot cm$), and furthermore nickel is softer than tantalum. Accordingly, another reason is that the bolster member (4) made of nickel can be made to cut into the anode lead (22) more easily when performing the resistance-welding.

Moreover, the bolster member (4) may be made from stainless steel. The bolster member (4) can be made of stainless steel at a lower cost than nickel or tantalum. Additionally, depending on the components of the stainless steel, the hardness, thermal conductivity, and melting temperature of the bolster member (4) can be adjusted as needed.

Figure 9:
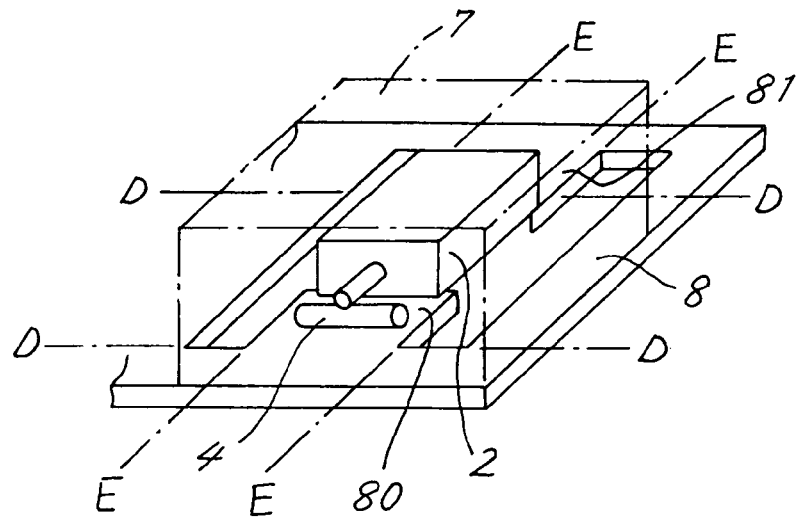
FIG. 9 is a perspective view showing a conventional method for manufacturing a solid electrolytic capacitor.
Figure 10:
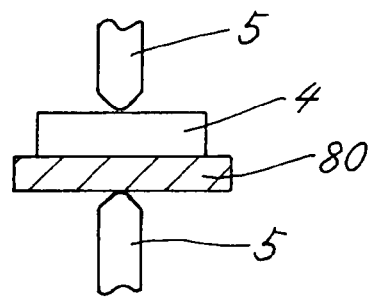
FIG. 10 is a front view showing a conventional method for manufacturing a solid electrolytic capacitor, viewing FIG. 8 from direction A.
Figure 11:
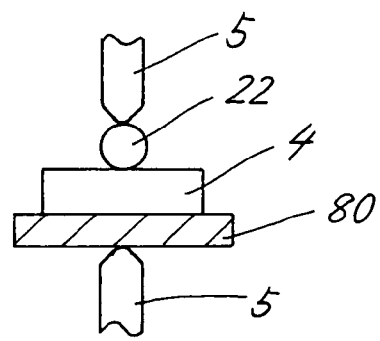
FIG. 11 is a front view showing a conventional method for manufacturing a solid electrolytic capacitor, viewing FIG. 8 from direction A.

Lastly, as shown in FIG. 9, the capacitor element (2) and the terminal component portions (80) and (81) are covered by a resin, forming a resin block (7), in the same manner as conventionally. This resin block (7) and the terminal component portions (80) and (81) are cut using a dicing saw or similar device along planes including line D—D and line E—E, obtaining the solid electrolytic capacitor (1).

EFFECTS OF THE PRESENT EMBODIMENT

The manufacturing method described above presents the following advantages.

1. After first wires (25) are joined to a second wire (40) while causing them to cut into the second wire (40), the second wire (40) is cut, thus forming the bolster member (4). Conventionally, there existed a danger of dropping and losing the bolster member (4) during the attachment process, because the finely cut bolster member (4) would be attached to the anode lead (22), but according to the present embodiment, this danger is eliminated because the second wire (40) is elongated. As a result, labor involved in manufacturing the solid electrolytic capacitor (1) is made easier.

2. After joining the first wires (25) to the second wire (40) using resistance welding, the bolster member (4) is formed and joined by resistance welding to the terminal component portion (80), which becomes a lead frame (9). Since welding current is only applied once to the terminal component portion (80), it is more difficult for spot defects to appear on a rear surface of the terminal component portion (80) during welding, compared to the conventional case. Furthermore, since welding current is applied to terminal component portion (80) a lower number of times, deformation of the terminal component portion (80) due to heat from that current is rarer.

Figure 12:
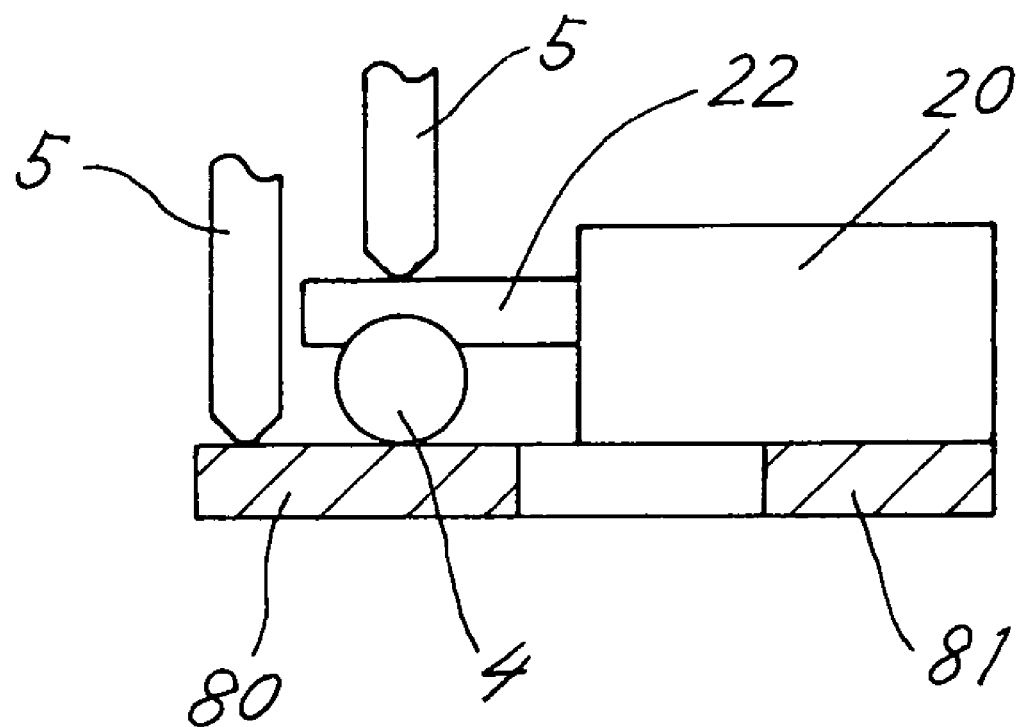
FIG. 12 is a side view showing another method for manufacturing a solid electrolytic capacitor.

Besides the polypyrrole mentioned above, materials for forming the cathode layer (3) include polythiophene, polyaniline, polyfuran, and other conductive high polymers, and TCNQ (7,7,8,8-tetracyanoquinodimethane) complex salt. In order to resistance-weld the terminal component portion (80) and the bolster member (4) by applying a current from the probes (5), it is possible to apply a positive and a negative probe (5) from above the bolster member (4), as shown in FIG. 12.

What is claimed is:

1. A solid electrolytic capacitor comprising a capacitor element provided with an anode body from which an anode lead projects, an anode-side lead frame positioned below the anode lead, and a bolster member which is provided between the anode lead and the anode-side lead frame and which electrically connects the anode lead and the anode-side lead frame and which is in the form of a wire or a bolster wire, wherein at least a portion of the anode body lead cuts into the bolster member.

2. The solid electrolytic capacitor according to claim 1 wherein at least 50% of the diameter of the anode body lead cuts into the bolster member in vertical direction.

3. The solid electrolytic capacitor according to claim 1, wherein the bolster member is formed from nickel or a nickel alloy.

4. The solid electrolytic capacitor according to claim 1, wherein the bolster member is formed from stainless steel.

5. A method for manufacturing a solid electrolytic capacitor comprising a capacitor element provided with an anode body from which an anode lead projects, an anode-side lead frame positioned below the anode lead, and a bolster member which is provided between the anode lead and the anode-side lead frame and which electrically connects the anode lead and the anode-side lead frame, the method comprising:

a step of lining up in the same orientation a plurality of anode bodies provided with first wires, which become anode leads;

a step of providing a second wire, which becomes the bolster member, straddling the plurality of first wires;

a step of joining overlapping sections of the first wires and the second wire and letting at least a part of the first wires cut into the second wire;

a step of forming the anode lead and the bolster member by cutting the first wires and second wire; and a step of placing the bolster member on the terminal component portion, which becomes the anode-side lead frame, and joining the terminal component portion and the bolster member.

6. The manufacturing method according to claim 5, wherein resistance welding is used to join the overlapping sections of the first wires and the second wire, and the terminal component portion and the bolster member.

* * * * *